United States Patent [19]
Powell

[11] Patent Number: 4,872,265
[45] Date of Patent: Oct. 10, 1989

[54] TRIMMER ATTACHMENT

[76] Inventor: David W. Powell, 11020 Upper Mount Vernon Rd., Mount Vernon, Ind. 47620

[21] Appl. No.: 188,856
[22] Filed: May 2, 1988
[51] Int. Cl.$^4$ .............................................. B26B 7/00
[52] U.S. Cl. .................................. 30/296 A; 30/276; 30/286
[58] Field of Search ................ 30/286, 276, 293, 391, 30/296 R; 56/12.7, 295; 172/13, 15, 24, 43

[56] References Cited

U.S. PATENT DOCUMENTS

| | | | |
|---|---|---|---|
| 971,924 | 10/1910 | Penrod | 30/286 X |
| 4,049,059 | 9/1977 | Weibling | 30/276 X |
| 4,693,008 | 9/1987 | Velie | 30/391 X |
| 4,756,084 | 7/1988 | Morita | 30/276 |

FOREIGN PATENT DOCUMENTS 1281640 12/1961 France ................................ 30/286

Primary Examiner—Frank T. Yost
Assistant Examiner—Michael D. Folkerts
Attorney, Agent, or Firm—Warren D. Flackbert

[57] ABSTRACT

A cutter attachment for a mono-filament type trimmer implement which includes a pivotal spacer assuring distance between the rotating string and the area under maintenance. Provision is made for readily mounting the attachment onto the implement and, as well, a locking arrangement serves to maintain the spacer in either an operative or a non-operative position. The configuration and/or design of the spacer permits selective movement in forward, rearward and lateral directions.

8 Claims, 2 Drawing Sheets

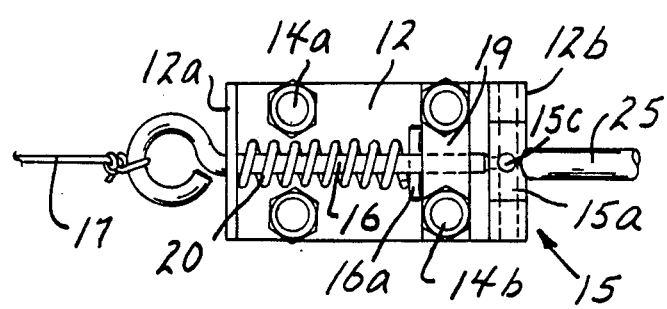
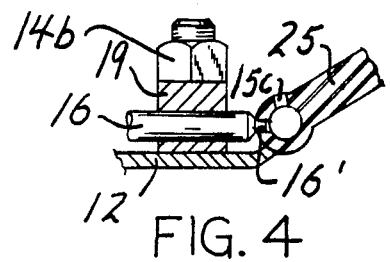
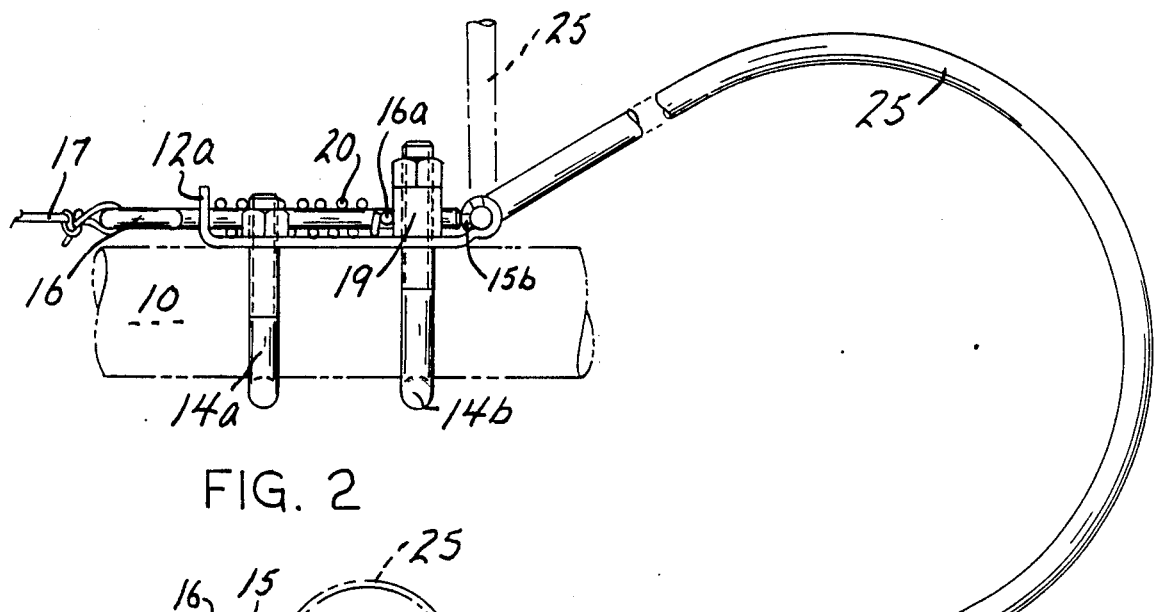
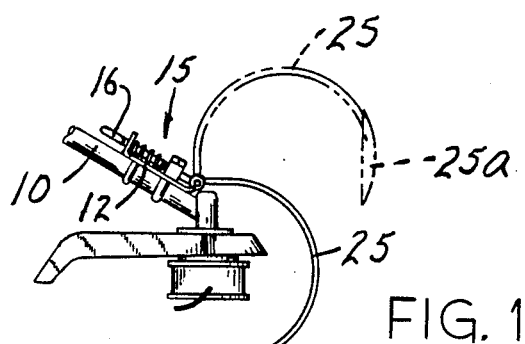
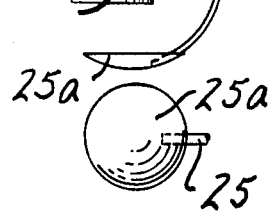
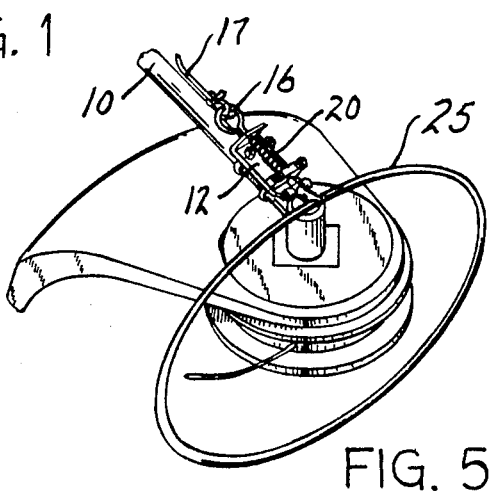

000
TRIMMER ATTACHMENT

As is known, lawn and/or yard trimming equipment of the mono-filament type, commonly marketed as "weed eaters", are in widespread use. An objectionable feature inherent with such, however, is the susceptibility of, for example, lawn scalping, i.e. in the instance where the equipment and/or implement is too close to the surface being trimmed.

The invention overcomes the preceding difficulty by presenting an attachment secured to the support shaft for the rotating mono-filament mechanism which, when at a locked position, maintains the mono-filament at a preselected distance from the surface under maintenance.

The attachment is in the form of an arcuate rod or spacer, typically elliptical in side elevation and optionally including a rounded or concave dish at the free end thereof. The aforesaid arcuate spacer serves to permit ready movement of the trimmer without the concern of scalping. In another form, a closed elliptical member is secured to the implement shaft for permitting particular ease in lateral movement.

In any event, a better understanding of the present invention will become more apparent from the following description, taken in conjunction with the accompanying drawing, wherein

DESCRIPTION OF THE FIGURES

FIG. 1 is a view in side elevation showing a trimmer mechanism in accordance with the teachings of the present invention;

FIG. 1A is a top plan view detailing a ground engaging dish used in association with the invention form of FIG. 1;

FIG. 2 is an enlarged view of the instant attachment, detailing the securing and locking arrangement for such;

FIG. 3 is a top plan view, looking downwardly on FIG. 2, further detailing the invention;

FIG. 4 is a view in vertical section, showing still added details of the securing and locking arrangement; and, FIG. 5 is a perspective view of an alternative invention form, in this instance being the use of a closed elliptical attachment in position on the hand-controlled implement.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIGS. 1 to 4, inclusive, the attachment herein is used in conjunction with a conventional mono-filament type lawn and/or yard trimmer (a portion of the mechanism support shaft 10 of which is shown in phantom lines in FIG. 2—but also see FIG. 1).

The attachment includes a base plate 12, typically secured, by U-bolt and nut combinations 14a, 14b, to the aforesaid shaft 10. The base plate 12 presents an upturned rear edge 12a, i.e. towards the operator, and a front edge 12b defining a control assembly 15 including a pivotal central portion 15a, where the latter mounts an arcuate shaped spacer 25 selectively movable from the solid line position to the phantom line position of FIGS. 1 and 2, and conversely.

A longitudinally disposed control pin 16 extends through the upturned rear edge 12a of base plate 12, where a wire 17 (or the like) is secured to such to permit remote usage of the control pin 16 by the operator. The control pin 16 extends through a transverse member 19 disposed beneath the front U-bolt and nut combination 14b (see FIGS. 2 and 3). A laterally extending pin 16a extends through the control pin 16 and seats, together with one side of upturned rear edge 12a of base plate 12, a spring member 20. In other words, the control pin 16 is continually urged into an operative or locking position.

The pivotal central portion 15a of the control assembly 15 includes two radial openings 15b and 15c adapted to receive a reduced diameter end 16' of the control pin 16 (see FIG. 4). In other words, the pivotal central portion 15a to which the spacer 25 is secured may be locked into the operative solid line position of FIGS. 2 and 4, i.e. into radial opening 15b, but with the disengagement of control pin 16 by the operator, the spacer 25 may be moved to the phantom line position of FIGS. 1 and 2 and retained at such position by deployment of the end 16' of the control pin 16 into radial opening 15c.

All of the preceding is also evident, but not necessarily detailed, in FIG. 1, where more of the mono-filament line trimmer mechanism is disclosed. The use and non-use positions of the spacer 25 are quite apparent in the FIG. 1 showing. As mentioned hereabove, a concave dish 25a may be used at the end of the spacer 25, such serving to permit added directional usage of the spacer 25 on the terrain, i.e., and for example, both backwardly, forwardly, and laterally.

FIG. 5 shows an arrangement quite similar controlwise to FIGS. 1 to 4, inclusive; however, in this instance, spacer 25 assumes a full elliptical shape in elevation. Such an arrangement proves quite useful in instances where lateral motion is mainly involved.

It should be evident, therefore, from the preceding that the instant cutter attachment presents an effective approach to avoiding lawn scalping problems through the use of the positively positioned arcuate spacer. Actually, the latter is usable in three forms, i.e. as a partial ellipse in side elevation; a partial ellipse in side elevation, but including a dish or concave saucer at the free end thereof; or, a complete ellipse in side elevation. Any reference to ellipse and/or elliptical herein should broadly be understood as referring to a generally curved shape.

Moreover, the cutter attachment described hereabove is susceptible to various other changes within the spirit of the invention, including, by way of example, proportioning; the precise arrangement for maintaining the spacer in operative and non-operative positions; the manner of securing the attachment to the implement; the described spacer shape; and, the like. Thus, the preceding should be considered illustrative and not as limiting the scope of the following claims:

I claim:

1. An attachment for an implement including a support shaft and a cutter in the form of a rotatable monofilament used for lawn trimming mounted at the free end thereof comprising a base secured to said support shaft, a spacer pivotally mounted on said base and selectively engaging and movable on a lawn area, said spacer serving to maintain said cutter vertically distant from said lawn area at an operative position so as to avoid lawn scalping while trimming, and means mounted on said base and cooperable with said spacer selectively locking said spacer at said operative position.

2. The attachment of claim 1 where said locking means includes openings forming part of said spacer, and a pin continually urged into one of said openings, where said openings represent operative and non-operative positions of said spacer.

3. The attachment of claim 2 where said pin is remotely controlled by an operator to override normal pin movement.

4. The attachment of claim 1 where said spacer has a partial elliptical shape.

5. The attachment of claim 1 where said spacer has a partial elliptical shape and includes an upwardly facing concave dish at a free end.

6. The attachment of claim 1 where said spacer has a total elliptical shape.

7. The attachment of claim 5 where said spacer is disposed in the longitudinal direction of said support shaft.

8. The attachment of claim 6 where said spacer is disposed in a lateral direction with respect to the longitudinal axis of said support shaft.

* * * * *